US012709286B2

(12) United States Patent
Chen

(10) Patent No.: US 12,709,286 B2
(45) Date of Patent: Aug. 18, 2026

(54) VEHICLE SENSOR MANAGEMENT METHOD, APPARATUS, AND SYSTEM

(71) Applicant: Yinwang Intelligent Technologies Co., Ltd., Shenzhen (CN)

(72) Inventor: Xiubo Chen, Dongguan (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 323 days.

(21) Appl. No.: 17/749,617

(22) Filed: May 20, 2022

(65) Prior Publication Data

US 2022/0274610 A1 Sep. 1, 2022

Related U.S. Application Data

(63) Continuation of application No. PCT/CN2020/092762, filed on May 28, 2020.

(30) Foreign Application Priority Data

Nov. 20, 2019 (CN) ......................... 201911142908.5

(51) Int. Cl.
*B60W 50/029* (2012.01)
*B60W 60/00* (2020.01)

(52) U.S. Cl.
CPC ........ *B60W 50/029* (2013.01); *B60W 60/001* (2020.02); *B60W 2050/0292* (2013.01); *B60W 2420/403* (2013.01); *B60W 2420/408* (2024.01)

(58) Field of Classification Search
CPC .......................... B60W 50/029; B60W 60/001
See application file for complete search history.

(56) References Cited

U.S. PATENT DOCUMENTS 10,946,865 B1 * 3/2021 Lin .................. B60W 50/0205
11,648,673 B2 * 5/2023 Beardsworth ........ B25J 19/0025 700/245

(Continued)

FOREIGN PATENT DOCUMENTS

CN 104870260 A 8/2015
CN 105652780 A 6/2016

(Continued)

OTHER PUBLICATIONS

James Urton, "Using a laser to wirelessly charge a smartphone safely across a room," Feb. 20, 2018, UW News, 6 pages.

(Continued)

*Primary Examiner* — Jess Whittington
(74) *Attorney, Agent, or Firm* — Conley Rose, P.C.

(57) ABSTRACT

A sensor management system of an intelligent vehicle includes at least two groups of sensors, and each group of sensors is connected to one intelligent driving controller. Different intelligent driving controllers communicate with each other using an interconnection module. A first intelligent driving controller receives first data sent by a first group of sensors, where the first data is data collected by the first group of sensors. Then, the first intelligent driving controller receives second data sent by a second intelligent driving controller, where the second data is data collected by a second group of sensors connected to the second intelligent driving controller. Then, the first intelligent driving controller determines a first traveling track of the intelligent vehicle based on the first data and the second data.

20 Claims, 7 Drawing Sheets

(56) References Cited

U.S. PATENT DOCUMENTS

| | | | |
|---|---|---|---|
| 2004/0052208 | A1 | 3/2004 | Vollmer et al. |
| 2009/0024584 | A1* | 1/2009 | Dharap .................. G06Q 50/40 |
| 2009/0077412 | A1* | 3/2009 | Langford ............ G06F 11/2038 714/4.1 |
| 2010/0030421 | A1 | 2/2010 | Yoshimura et al. |
| 2010/0141416 | A1* | 6/2010 | Kukshya ............. B60C 23/0433 340/447 |
| 2012/0215348 | A1* | 8/2012 | Skrinde .................... B25J 9/163 701/2 |
| 2014/0114498 | A1* | 4/2014 | Pichler .............. B60W 50/0098 701/1 |
| 2015/0330792 | A1 | 11/2015 | Stahlin et al. |
| 2016/0219223 | A1* | 7/2016 | Eline ...................... A63H 27/12 |
| 2017/0019166 | A1 | 1/2017 | Yadlowsky |
| 2017/0139598 | A1 | 5/2017 | Matsuda et al. |
| 2017/0242769 | A1* | 8/2017 | Sherlock ............. G06F 11/2092 |
| 2017/0334437 | A1 | 11/2017 | Mikami et al. |
| 2018/0037259 | A1 | 2/2018 | Hawes et al. |
| 2018/0348754 | A1 | 12/2018 | Samii et al. |
| 2019/0041837 | A1* | 2/2019 | Elenich .............. G05B 23/0251 |
| 2019/0079513 | A1* | 3/2019 | Greenfield ........... G05D 1/0077 |
| 2019/0100237 | A1* | 4/2019 | Klesing ................ B62D 5/0484 |
| 2019/0137619 | A1* | 5/2019 | Fetterman ............. G01S 13/931 |
| 2019/0204092 | A1* | 7/2019 | Wheeler .............. G01C 21/165 |
| 2019/0215233 | A1 | 7/2019 | Huang et al. |
| 2019/0235504 | A1* | 8/2019 | Carter .................. G05D 1/0212 |
| 2019/0250611 | A1* | 8/2019 | Costin ................. B60W 50/023 |
| 2019/0258251 | A1 | 8/2019 | Ditty et al. |
| 2019/0344800 | A1 | 11/2019 | Kim et al. |
| 2019/0359226 | A1 | 11/2019 | Ochida et al. |
| 2020/0148218 | A1* | 5/2020 | Huang ................ B60W 50/029 |
| 2020/0244478 | A1 | 7/2020 | Dieckmann et al. |
| 2020/0269876 | A1 | 8/2020 | Ando |
| 2020/0298871 | A1 | 9/2020 | Mukai et al. |
| 2020/0331495 | A1 | 10/2020 | Bracquemond |
| 2020/0356835 | A1* | 11/2020 | Robinson ............... G06N 3/006 |
| 2021/0001880 | A1 | 1/2021 | Hu |
| 2021/0061194 | A1 | 3/2021 | Sugawa et al. |
| 2021/0163021 | A1* | 6/2021 | Frazzoli .............. B60W 50/023 |
| 2021/0192867 | A1* | 6/2021 | Fang .................... G07C 5/0816 |
| 2021/0303745 | A1* | 9/2021 | Linkowski .............. G06F 30/13 |
| 2022/0227379 | A1* | 7/2022 | Robinson ............. G06N 3/0442 |
| 2022/0274610 | A1 | 9/2022 | Chen |
| 2022/0334582 | A1* | 10/2022 | Bryner ................... G01N 29/04 |

FOREIGN PATENT DOCUMENTS

| | | | |
|---|---|---|---|
| CN | 106004884 | A | 10/2016 |
| CN | 106254097 | A | 12/2016 |
| CN | 107415926 | A | 12/2017 |
| CN | 107685730 | A | 2/2018 |
| CN | 108162977 | A | 6/2018 |
| CN | 108170126 | A | 6/2018 |
| CN | 108205279 | A | 6/2018 |
| CN | 108762152 | A | 11/2018 |
| CN | 108974015 | A | 12/2018 |
| CN | 109255442 | A | 1/2019 |
| CN | 109690434 | A | 4/2019 |
| CN | 109814552 | A | 5/2019 |
| CN | 110001660 | A | 7/2019 |
| CN | 110077420 | A | 8/2019 |
| CN | 110290998 | A | 9/2019 |
| CN | 110450850 | A | 11/2019 |
| CN | 111025959 | A | 4/2020 |
| CN | 111108724 | A | 5/2020 |
| JP | 2003115847 | A | 4/2003 |
| JP | 2017091355 | A | 5/2017 |
| JP | 2019089382 | A | 6/2019 |
| JP | 2019134301 | A | 8/2019 |
| WO | 2019116870 | A1 | 6/2019 |

OTHER PUBLICATIONS

Jose Rufino et al, "Enforcing Dependability and Timeliness in Controller Area Networks," 32nd Annual Conference on IEEE Industrial Electronics, IECON, Nov. 1, 2006, XP031077692, 6 pages.

Naoshige Shimizu, GM driverless car, Defeat Googles strongest contender, Mass-produced in 2019, Nikkei Automotive, vol. 85, Nikkei Automotive, Japan, Nikkei Business Publications, Inc., Nikkei Business Publications, Inc., Mar. 11, 2018, with English translation, v9 pages.

Tsuguo Nobe, Thorough explanation, Future of cars created by ICT, First edition, First edition, Nikkei Business Publications, Inc., Nikkei Business Publications, Inc., Yosuke Mochizuki, Dec. 11, 2015, with English translation, 5 pages.

* cited by examiner

VEHICLE SENSOR MANAGEMENT METHOD, APPARATUS, AND SYSTEM

CROSS-REFERENCE TO RELATED APPLICATIONS

This is a continuation of International Patent Application No. PCT/CN2020/092762 filed on May 28, 2020, which claims priority to Chinese Patent Application No. 201911142908.5 filed on Nov. 20, 2019. All of the aforementioned patent applications are hereby incorporated by reference in their entireties.

TECHNICAL FIELD

This application relates to the field of vehicles, and in particular, to a data management method, apparatus, and device, and an intelligent vehicle.

BACKGROUND

As an artificial intelligence (AI) technology is applied to the field of conventional vehicles, intelligent driving gradually becomes an inevitable development trend in the field of vehicles. A research direction of the intelligent driving is autonomous (or automated) driving (AD). The International Society of Automotive Engineers (SAE International) defines a plurality of levels, such as L0 to L5, of autonomous driving based on degrees of automation from low to high, where L1 represents manual driving and L5 represents full-autonomous driving. Requirements on functional safety of intelligent vehicles increase with the level.

Various types of sensors in an intelligent vehicle are connected to an intelligent driving controller by using a vehicle gateway. The vehicle gateway sends data collected by the sensors to the intelligent driving controller, and then the intelligent driving controller controls the vehicle. To meet security and reliability requirements of the intelligent vehicle, a plurality of vehicle gateways are usually deployed in the intelligent vehicle. The intelligent driving controller communicates with the sensors by using the vehicle gateways. The vehicle gateways collect and aggregate the data collected by the sensors, and then send the aggregated data to the intelligent driving controller. However, deployment of the plurality of gateways occupies limited space in the vehicle and increases costs of the entire vehicle. Therefore, how to provide a data management method that is easy to implement and that has low costs becomes a technical problem to be urgently resolved.

SUMMARY

This application provides a data management method, apparatus, and device, and a system, to implement sensor redundancy, and ensure security and reliability of intelligent driving. In addition, no additional hardware device that occupies limited space in a vehicle, such as an external gateway, is added. This is easy to implement, and has low costs.

According to a first aspect, a data management method is provided, where the method is applied to a sensor management system of an intelligent vehicle. The sensor management system includes at least two groups of sensors and at least two intelligent driving controllers, each group of sensors are connected to one intelligent driving controller, and different intelligent driving controllers communicate with each other by using an interconnection module. The method includes: A first intelligent driving controller receives first data sent by a first group of sensors, where the first group of sensors include at least one sensor, and the first data is data collected by the first group of sensors; then the first intelligent driving controller receives second data sent by a second intelligent driving controller, where the second data is data collected by a second group of sensors connected to the second intelligent driving controller, the second intelligent driving controller is connected to the second group of sensors, the second group of sensors include at least one second sensor, and the second data is the data collected by the second group of sensors; and the first intelligent driving controller receives determines a first traveling track of the intelligent vehicle based on the first data and the second data. According to the foregoing method, sensors are grouped and connected to different intelligent driving controllers, and the intelligent driving controllers forward, by using interconnection modules, data collected by the sensors, so that aggregation of data collected by each group of sensors is implemented on each intelligent driving controller, and sensor redundancy is implemented. In this method, no hardware device such as an external gateway that occupies limited space in a vehicle is added. This is easy to implement, and has low costs.

In a possible implementation, each group of sensors include different sensor groups that are divided according to a preset rule, where the preset rule includes: first, grouping sensors based on locations of the sensors in the intelligent vehicle, and sensors in a same group can collect data of a 360-degree area around the intelligent vehicle. In this way, even if one group of sensors or one sensor is faulty, the data of the 360-degree area around the intelligent vehicle can be obtained based on another sensor group; and then grouping the sensors based on sensor types, where each sensor belongs to only one sensor group.

In another possible implementation, each intelligent driving controller includes a first control module, a second control module, and an interconnection module. The first control module and the second control module separately communicate with the interconnection module through a high-speed bus, and the first control module communicates with the second control module through a low-speed bus. The first control module is configured to configure and manage the interconnection module, the second control module is configured to manage the interconnection module when the first control module is faulty, and the interconnection module is configured to transmit data between different intelligent driving controllers.

In another possible implementation, the first intelligent driving controller includes three modes. When a security level required by the intelligent vehicle is higher than a preset level, the first intelligent driving controller is set to a dual-controller redundancy mode. When the security level required by the intelligent vehicle is not higher than the preset level, the first intelligent driving controller is set to a first control module-only control mode. When the first control module is faulty, the first intelligent driving controller is set to a second control module-only control mode.

In another possible implementation, an interconnection module of the first intelligent driving controller communicates with an interconnection module of the second intelligent driving controller through a high-speed bus, and a second control module of the first intelligent driving controller communicates with a second control module of the second intelligent driving controller through a low-speed bus.

In another possible implementation, the method further includes: The first intelligent driving controller sends a probe request signal to a first control module of the first intelligent driving controller by using the second control module of the first intelligent driving controller; and when no probe response signal is received in K consecutive periodicities, the first intelligent driving controller determines that the first control module is faulty, where K is a positive integer.

In another possible implementation, the method further includes: The first intelligent driving controller sends a probe request signal to the second intelligent driving controller; and when no probe response signal is received in K consecutive periodicities, the first intelligent driving controller determines that the second intelligent driving controller is faulty, where K is a positive integer.

In another possible implementation, the method further includes: The first intelligent driving controller sends the first data to the second intelligent driving controller, so that the second intelligent driving controller determines a second traveling track of the intelligent vehicle based on the first data and the second data, and sends the second traveling track to an arbiter.

In another possible implementation, the method further includes: The first intelligent driving controller sends the first traveling track to the arbiter, so that the arbiter determines a traveling track of the intelligent vehicle based on the first traveling track and the second traveling track.

According to a second aspect, this application provides a data management apparatus, where the management apparatus includes units configured to perform the data management method according to any one of the first aspect or the possible implementations of the first aspect.

According to a third aspect, this application provides a data management device, including a processor and a memory, where the memory is configured to store computer instructions, and the processor is configured to perform, according to the computer instructions, the data management method according to any one of the first aspect or the possible implementations of the first aspect.

According to a fourth aspect, this application provides an intelligent driving vehicle, where the intelligent vehicle includes a sensor management system. The sensor management system includes at least two groups of sensors, each group of sensors are connected to one intelligent driving controller, and different intelligent driving controllers communicate with each other by using an interconnection module. A first intelligent driving controller receives first data sent by a first group of sensors, and is configured to receive data collected by the first group of sensors. The first group of sensors include at least one sensor, and the first data is the data collected by the first group of sensors. The first intelligent driving controller receives second data sent by a second intelligent driving controller, and the second data is data collected by a second group of sensors connected to the second intelligent driving controller. The first intelligent driving controller determines a first traveling track of the intelligent vehicle based on the first data and the second data.

According to a fifth aspect, this application provides a sensor management system, where the sensor management system includes at least two groups of sensors, each group of sensors are connected to one intelligent driving controller, and different intelligent driving controllers communicate with each other by using an interconnection module. A first intelligent driving controller receives first data sent by a first group of sensors, and is configured to receive data collected by the first group of sensors. The first group of sensors include at least one sensor, and the first data is the data collected by the first group of sensors. The first intelligent driving controller receives second data sent by a second intelligent driving controller, and the second data is data collected by a second group of sensors connected to the second intelligent driving controller. The first intelligent driving controller determines a first traveling track of the intelligent vehicle based on the first data and the second data.

According to a sixth aspect, this application provides a computer-readable storage medium. The computer-readable storage medium stores instructions. When the instructions are run on a computer, the computer is enabled to perform the method in the foregoing aspect.

According to a seventh aspect, this application provides a computer program product including instructions. When the computer program product is run on a computer, the computer is enabled to perform the method according to the foregoing aspect.

Based on the implementations provided in the foregoing aspects, this application may provide more implementations through further combination.

DESCRIPTION OF EMBODIMENTS

The following clearly describes technical solutions in this application with reference to the accompanying drawings in embodiments of this application.

Figure 1:
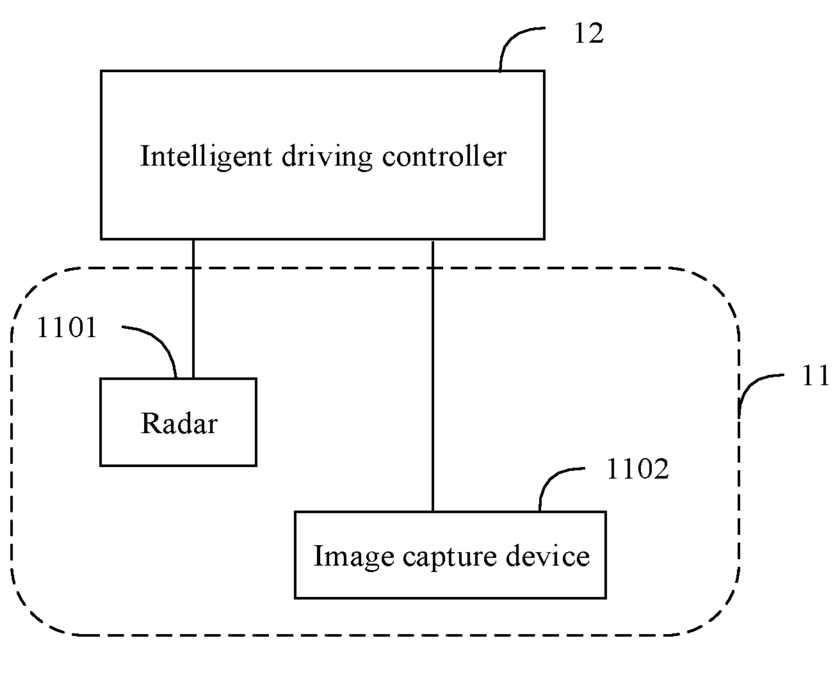
FIG. 1 is a schematic diagram of a logical architecture of a data management system of an intelligent vehicle according to this application.

FIG. 1 is a schematic diagram of a logical structure of a sensor management system of an intelligent vehicle according to this application. As shown in the figure, the system includes a sensor 11 and an intelligent driving controller 12. The sensor 11 may be specifically a single-port device. That is, the sensor 11 includes only one data transmission port, and transmits data to the intelligent driving controller 12 through the data transmission port. The system includes two or more intelligent driving controllers 12. A redundancy design is formed between different devices of the two or more intelligent driving controllers 12. When any device of the intelligent driving controller 12 is faulty, the other device may assist in completing a data processing process, to avoid a single point of failure of the intelligent driving controller 12 that affects safety and reliability of the intelligent vehicle.

The sensor 11 in FIG. 1 may specifically include a radar 1101 and an image capture device 1102. The radar 1101 may include light detection and ranging (lidar) and radio detection and ranging (radar), where the radio detection and ranging is further divided into a millimeter wave radar (mmw radar) and an ultrasonic radar based on radio waves. Considering that the lidar has a wide detection range and high detection accuracy, and the mmw radar has a strong penetration capability, can adapt to complex and changeable weather, and has a relatively stable detection performance, in actual application, at least one lidar and one mmw radar are configured in an intelligent vehicle for target detection. The image capture device 1102 may be any device having a camera, for example, may be a camera.

The foregoing components or devices may communicate with each other through a controller area network (CAN), a vehicle Ethernet, or the like. This is not limited in this application. The devices in the intelligent driving controller 12 that form the redundancy design may be devices of a same type, or may be devices of different types in some cases, for example, controllers of different types. Further, the intelligent driving controller 12 is merely an example in this application. In another possible implementation, the sensor management system may include another type of controller, for example, a vehicle control unit, and sensors corresponding to the vehicle control unit.

Optionally, in addition to the single-port device, the sensor may be further a multi-port device. This is not limited in this application.

Figure 2:
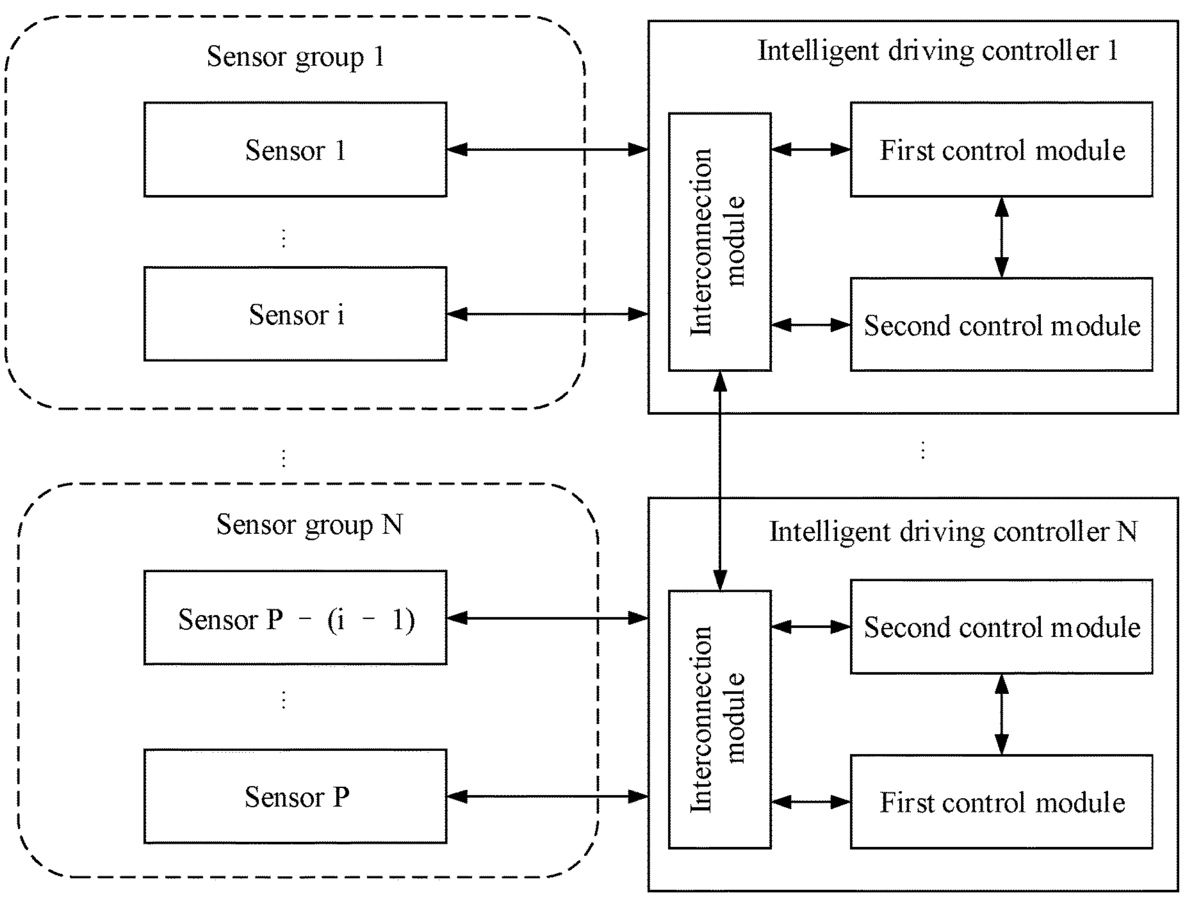
FIG. 2 is a schematic diagram of another logical architecture of a data management system of an intelligent vehicle according to this application.

FIG. 2 is a diagram of another logical structure of the sensor management system of the intelligent vehicle according to an embodiment of this application. A difference between FIG. 2 and FIG. 1 is that a structure of an intelligent driving controller and a relationship between sensors and intelligent driving controller are further explained in FIG. 2. As shown in the figure, sensors are divided into a plurality of groups, each group of sensors are connected to one intelligent driving controller, and different intelligent driving controllers communicate with each other by using an interconnection module. For ease of description, the at least two groups of sensors may be sequentially denoted as sensor groups 1 to N. Intelligent driving controllers connected to the groups of sensors are sequentially denoted as intelligent driving controllers 1 to N, where N is a positive integer greater than 1.

An intelligent driving controller i (i is any integer from 1 to N) may receive first data sent by a group of sensors, namely, a sensor group i, that is connected to the intelligent driving controller i, and receive second data sent by another intelligent driving controller (for example, an intelligent driving controller other than the intelligent driving controller i in the intelligent driving controllers 1 to N), where the second data is data collected by a sensor group (for example, a sensor group other than the sensor group i in the sensor groups 1 to N) that is connected to the another intelligent driving controller. Then the intelligent driving controller i determines a traveling track of the intelligent vehicle based on the first data and the second data.

In the embodiment shown in FIG. 2, the sensors may be specifically grouped according to a preset rule. The preset rule may be: first grouping the sensors based on locations of the sensors in the intelligent vehicle, where each sensor belongs to only one sensor group, and sensors in a same group can collect data in a 360-degree area around the intelligent vehicle. When a group of sensors or one sensor is faulty, another group of sensors can still collect data in the 360-degree area around the intelligent vehicle, to prevent the intelligent vehicle from being out of control due to data missing in an area. Then, the sensors are grouped based on sensor types, so that each group of sensors cover as many sensor types as possible, to avoid a case in which a group of sensors do not collect a type of data because all the sensors in the sensor group are of a same type.

Figure 3:
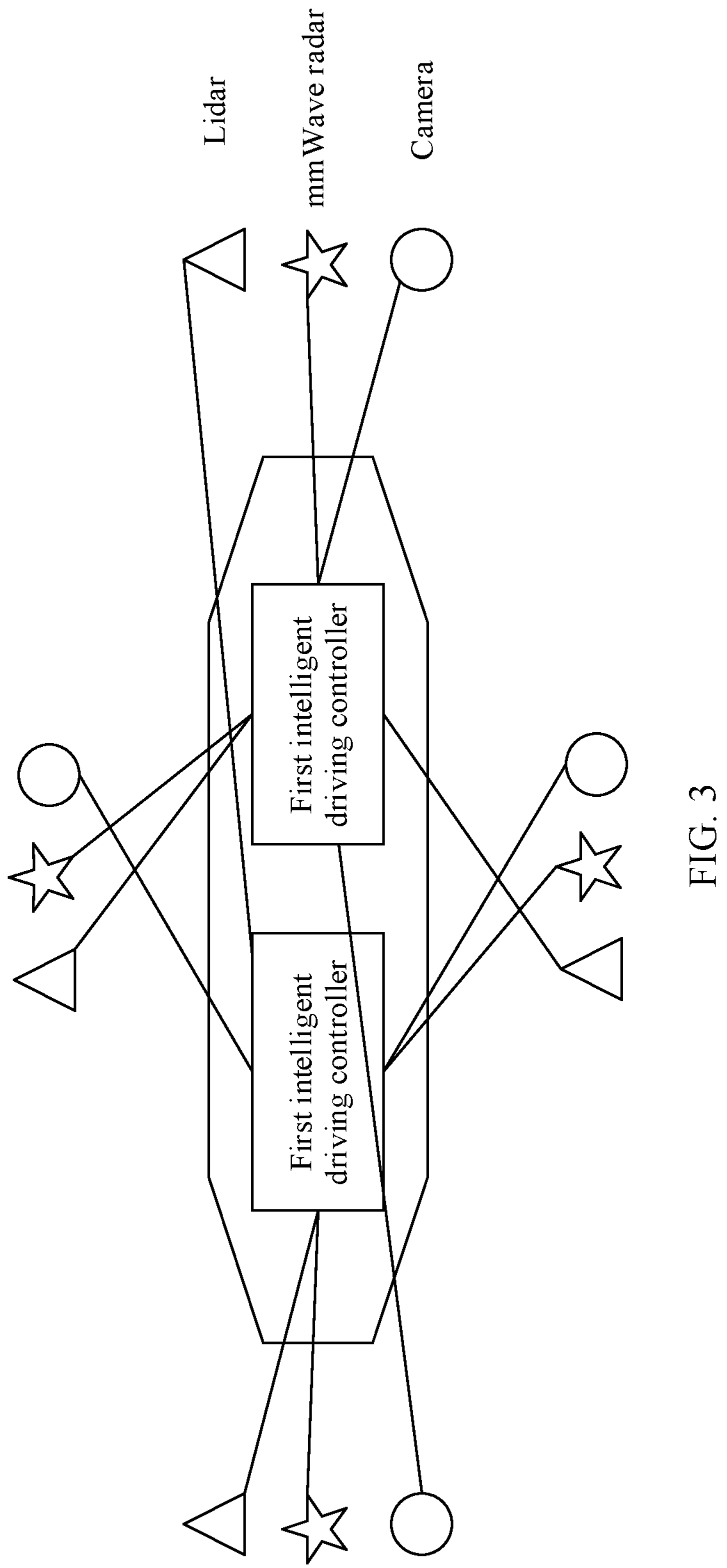
FIG. 3 is a schematic diagram of grouping of sensors in a sensor management system of an intelligent vehicle according to this application.

For ease of understanding, this application further provides a specific example to describe a sensor grouping process. Refer to FIG. 3. The sensor management system may include three types of sensors: lidar, radar, and a camera. A quantity of sensors of each type is 4, and the four sensors cover four directions of a vehicle body, such as the front, the rear, the left, and the right. The sensors are first grouped based on the locations of the intelligent vehicle. For example, two front sensors, two left sensors, one right sensor, and one rear sensor are divided to a first group, and one front sensor, one left sensor, two right sensors, and two rear sensors are divided to a second group. In this way, both the first group of sensors and the second group of sensors can collect the data of the 360-degree area around the intelligent vehicle. Then, the sensors are grouped based on the sensor types. For example, two lidars, two radars, and two cameras are divided to the first group, and the other two lidars, two radars, and two cameras are divided to the second group.

In this example, the first group of sensors may include a front lidar, a left camera, a rear lidar, a rear radar, a right radar, and a right camera. The second group of sensors may include a front radar, a front camera, a left lidar, a left camera, a rear camera, and a right lidar. It may be understood that a quantity of sensors in each group may be the same or different. For example, in some cases, a quantity of sensors in the first group may be 7, and a quantity of sensors in the second group may be 5. In actual application, balancing of a quantity of sensors in each group may implement balancing of the intelligent driving controllers connected to each group of sensors.

Each intelligent driving controller includes an interconnection module, a first control module, and a second control module. Both the first control module and the second control module may configure and manage the interconnection module. The configuration of the interconnection module mainly includes configuring transmission parameters to start the interconnection module. The transmission parameters may include a port, a virtual local area network (VLAN), and a transmission rate. The management of the interconnection module mainly includes monitoring a working status of the interconnection module and checking data transmitted by the interconnection module.

When dual-controller redundancy configuration is performed on the interconnection module by using the first control module and the second control module, the first control module performs power-on and reset deassertion on the interconnection module by default, configures the transmission parameters of the interconnection module, and starts the interconnection module. The interconnection module receives data sent by a group of sensors connected to the interconnection module, and then transmits the data to the first control module of the intelligent driving controller and a first control module of another intelligent driving controller. In this way, a first control module of each intelligent driving controller may receive data collected by sensors connected to the intelligent driving controller and data that is collected by other sensors and shared by the another intelligent driving controller. Therefore, each intelligent driving controller can obtain data collected by sensors 1 to P.

When an intelligent driving controller is faulty, for example, when a first control module is faulty, a second control module takes over an interconnection module, monitors a working status of the interconnection module, and checks data transmitted by the interconnection module. A case in which the intelligent vehicle is out of control because the interconnection module is not supervised can be avoided, and the interconnection module can still work normally. In this case, the interconnection module may receive data sent by a group of sensors connected to the interconnection module, and transmit the data to a first control module of another intelligent driving controller. The another intelligent driving controllers can still obtain data from sensors 1 to P. This ensures data integrity and implements data redundancy. It should be noted that, to avoid impact of the first control module on the interconnection module, an independent clock and power supply may be configured in the interconnection module.

In actual application, the interconnection module, the first control module, and the second control module of the intelligent driving controller may be implemented by using three independent chips, and each chip includes a processor and a storage unit. The processor may be any type of processor. For example, the processor may be a central processing unit (CPU), a digital signal processor (DSP), an application-specific integrated circuit (ASIC), or a field-programmable gate array (FPGA).

In a possible implementation, the intelligent driving controller may alternatively be implemented by using two independent chips. The interconnection module and the second control module are deployed on one chip, and the first control module is independently deployed on the other chip. Further, the intelligent driving controller may alternatively be implemented by using one chip, and software functions of the interconnection module and the second control module are implemented by using the chip of the first control module.

Figure 4:
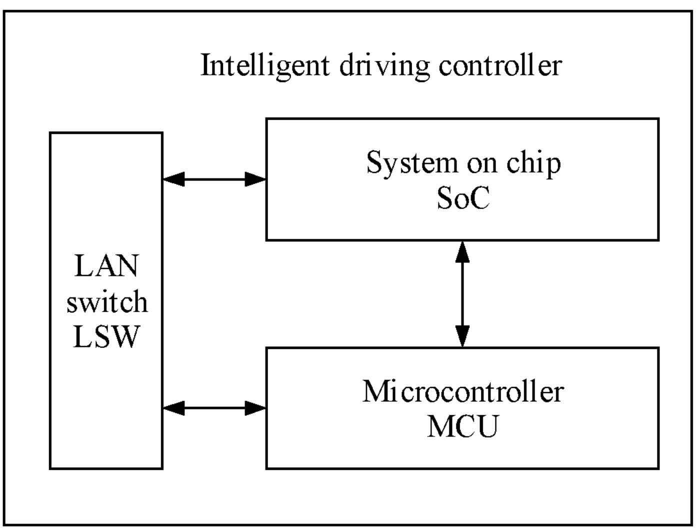
FIG. 4 is a schematic diagram of a structure of an intelligent driving controller of an intelligent vehicle according to this application.

In consideration of reliability and costs, in actual application, refer to FIG. 4. A system on chip (SoC) may be used as the first control module, and a microcontroller (e.g., a microcontroller unit (MCU)) whose security level is higher than a preset level is used as the second control module. For example, the preset level is an automotive safety integration level (ASIL) B, and an MCU of ASIL D may be used as the second control module. The interconnection module may be implemented by using a local area network switch (LSW).

It should be noted that the system architectures shown in FIG. 1 and FIG. 2 are merely examples of the system architectures provided in the data management method provided in this application. The connection relationship between the sensors and the intelligent driving controllers shown in FIG. 3 is merely an example for better describing grouping of sensors provided in the data management method provided in this application. The structure of the intelligent driving controller shown in FIG. 4 is merely an example for better describing the structure of the intelligent driving controller provided in the data management method provided in this application. These constitute no limitation on the embodiments of this application.

This application provides a data management method. In the method, sensors are grouped, and each group of sensors are connected to one intelligent driving controller. An interconnection module inside the intelligent driving controller serves as a switching center in the intelligent driving controller. Each intelligent driving controller may receive, by using a switching center, data collected by a group of sensors connected to the intelligent driving controller, and receive data that is collected by another group of sensors and sent by another intelligent driving controller. In this way, each intelligent driving controller can obtain complete sensor data to implement a sensor redundancy solution. The intelligent driving controller generates a traveling track of an intelligent vehicle based on the complete sensor data, and driving safety can be ensured when the intelligent vehicle travels according to the traveling track. In addition, in the method, no hardware device needs to be customized, and no additional hardware device, such as a vehicle gateway and a cable connected to the vehicle gateway, is added. Therefore, limited space in the vehicle is not occupied, deployment is simple, and costs are reduced.

In addition, in this application, dual-controller redundancy configuration is further performed on an interconnection module by using a first control module and a second control module in the intelligent driving controller, so that when the first control module is faulty, the second control module takes over and monitors the interconnection module, to avoid impact of the first control module on the interconnection module. The interconnection module can still transmit data to a first control module of another intelligent driving controller, to implement redundant control management on the interconnection module. This improves reliability and security of a single intelligent driving controller. Further, the sensors are first grouped based on locations of the sensors in the intelligent vehicle, and then grouped based on sensor types, so that each group of sensors can cover a 360-degree area around a vehicle body. Even if a sensor or a group of sensors are faulty, the intelligent driving controller can also implement data redundancy based on data that is collected by another group of sensors and shared by another intelligent driving controller, to further improve reliability and a fault tolerance capability.

Next, the data management method provided in this application is described with reference to FIG. 5 by using an example in which a sensor system includes two intelligent driving controllers. As shown in the figure, the method includes the following steps.

S501: A first group of sensors send first data to a first intelligent driving controller.

The first group of sensors include at least one sensor, and the first data is data collected by the first group of sensors. The first group of sensors are connected to the first intelligent driving controller, and the first intelligent driving controller is configured to receive the data collected by the first group of sensors. In actual application, the first intelligent driving controller may send sensor configuration information to the first group of sensors in advance through a link connection between the first group of sensors and the first intelligent driving controller, so that the first group of sensors configure collection parameters such as collection periodicities and sensor angles based on the sensor configuration information. In this way, the sensors may collect the first data based on the foregoing collection parameters, and send the first data to the first intelligent driving controller through a link between the first group of sensors and the first intelligent driving controller.

In a process in which the first group of sensors send the first data, the first intelligent driving controller may further update the sensor configuration information based on the received first data, and then send updated sensor configuration information to the first group of sensors, so that the first group of sensors adjust the collection parameters based on the updated configuration information. For example, when a data amount of the first data cannot meet a requirement, the first intelligent driving controller may further update the sensor configuration information to adjust the collection periodicities of the sensors.

Considering that the data amount of the first data is relatively large, the link connection between the first group of sensors and the first intelligent driving controller may be implemented by using a high-speed bus. The high-speed bus is a bus whose rate is higher than a preset rate, and may be specifically vehicle Ethernet or a Peripheral Component Interconnect Express (PCIe). It should be noted that when the first data is a video stream, the high-speed bus may alternatively be a low-voltage differential signaling (LVDS) bus.

S502: A second group of sensors send second data to a second intelligent driving controller.

The second group of sensors include at least one sensor, and the second data is data collected by the second group of sensors. The second group of sensors are connected to the second intelligent driving controller, and the second intelligent driving controller is configured to receive the data collected by the second group of sensors. The second group of sensors may send the second data to the second intelligent driving controller in a same manner as the first group of sensors. A link connection between the second group of sensors and the second intelligent driving controller may be implemented in a same manner as the link connection between the first group of sensors and the first intelligent driving controller. Details are not described herein again.

It should be noted that S501 and S502 may be performed at the same time, or may be performed in a specified sequence. This is not limited in this application.

S503: The second intelligent driving controller sends the second data to the first intelligent driving controller.

The intelligent driving controllers communicate with each other by using an interconnection module. Therefore, the second intelligent driving controller may send the second data to an interconnection module of the first intelligent driving controller by using an interconnection module of the second intelligent driving controller. In this way, the first intelligent driving controller may obtain the first data collected by the first group of sensors and the second data collected by the second group of sensors, that is, can obtain complete data.

A link connection between the interconnection modules may be implemented by using a high-speed bus. In consideration of a transmission rate, the link connection may be implemented by gigabit Ethernet (GE) or 10 gigabit Ethernet (XGE, 10 GE).

S504: The first intelligent driving controller determines a first traveling track of an intelligent vehicle based on the first data and the second data.

It may be understood that an intelligent driving controller may determine a traveling track of the intelligent vehicle through calculation based on data collected by sensors. The traveling track may be identified by using traveling parameters, and is used to indicate the intelligent vehicle to travel according to the foregoing traveling parameters. The traveling parameters may specifically include information including a traveling speed, a traveling acceleration, and a traveling direction. In actual application, the traveling speed, the traveling acceleration, and the traveling direction may be represented by using curves that change with time, that is, a speed curve, an acceleration curve, and a direction curve. For ease of description, in this embodiment of this application, the traveling track determined by the first intelligent driving controller based on the first data and the second data is referred to as the first traveling track.

S505: The first intelligent driving controller sends the first traveling track to an arbiter.

Considering that the sensor management system may include a plurality of intelligent driving controllers, and each intelligent driving controller may determine a traveling track based on data collected by sensors, the first intelligent driving controller may further send the first traveling track to the arbiter, so that the arbiter performs arbitration based on the first traveling track and a traveling track sent by another intelligent driving controller, to determine a final traveling track. This can ensure security and reliability of intelligent driving.

In this embodiment, the arbiter is a component that can arbitrate traveling tracks sent by the plurality of intelligent driving controllers. As an example, the arbiter may be a vehicle control unit. The vehicle control unit may determine the final traveling track based on the received traveling tracks, and control the intelligent vehicle to travel according to the final traveling track. Certainly, in some possible implementations, the arbiter may alternatively be another component, for example, may be a component dedicated to traveling track arbitration.

The first intelligent driving controller may specifically send the first traveling track to the arbiter through a link connection between the arbiter and the first intelligent driving controller. The link connection may be implemented by using a high-speed bus. Details are not described herein again.

S506: The first intelligent driving controller sends the first data to the second intelligent driving controller.

Specifically, the first intelligent driving controller may further communicate with the second intelligent driving controller through a link connection between the interconnection modules, and send the first data to the interconnection module of the second intelligent driving controller by using the interconnection module of the first intelligent driving controller. In this way, the second intelligent driving controller may obtain the first data collected by the first group of sensors and the second data collected by the second group of sensors, that is, obtain the complete data.

S507: The second intelligent driving controller determines a second traveling track of the intelligent vehicle based on the first data and the second data.

In specific implementation, the second intelligent driving controller may calculate a traveling track of the intelligent vehicle in a same manner as the first intelligent driving controller. For ease of description, in this embodiment of this application, the traveling track determined by the second intelligent driving controller based on the first data and the second data is referred to as the second traveling track.

S508: The second intelligent driving controller sends the second traveling track to the arbiter.

The second intelligent driving controller may send the second traveling track to the arbiter through a link connection between the arbiter and the second intelligent driving controller. For a specific implementation process, refer to the related content description of sending the first traveling track to the arbiter by the first intelligent driving controller. Details are not described herein again.

S509: The arbiter determines the traveling track of the intelligent vehicle based on the first traveling track and the second traveling track.

Specifically, the arbiter may arbitrate the first traveling track and the second traveling track according to a preset arbitration rule, to determine the traveling track of the intelligent vehicle. The arbitration rule may be set based on a service requirement. In some possible implementations, the arbitration rule may be: determining the first traveling track as the traveling track of the intelligent vehicle by default, and when detecting that an error such as a check code error occurs on the first traveling track, determining the second traveling track as the traveling track of the intelligent vehicle. In other possible implementations, the arbitration rule may alternatively be: detecting the first traveling track and the second traveling track, when both the first traveling track and the second traveling track pass the detection, selecting any traveling track as the traveling track of the intelligent vehicle, and when an error occurs on one traveling track, determining the other traveling track as the traveling track of the intelligent vehicle.

Figure 5:
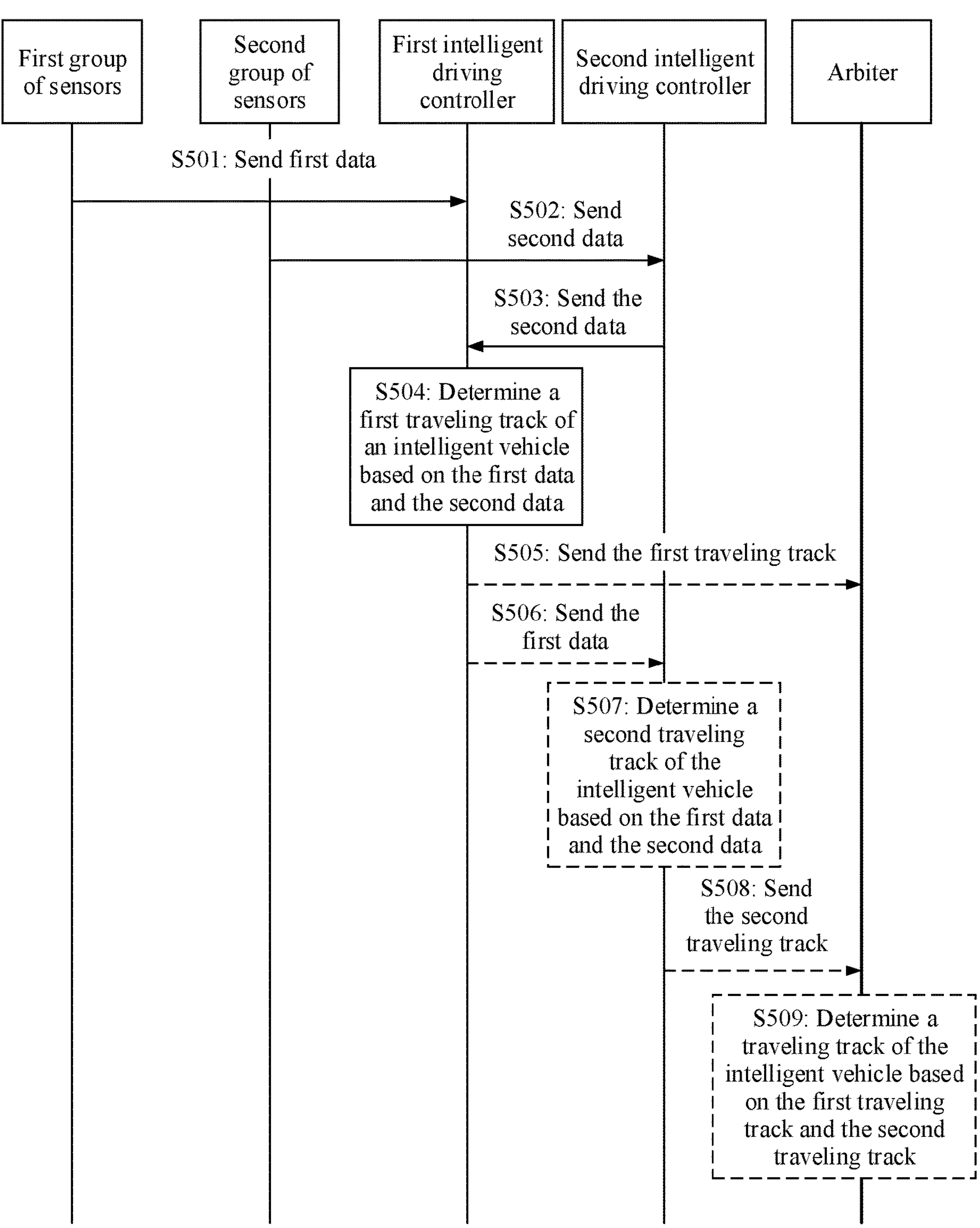
FIG. 5 is a schematic flowchart of a data management method for an intelligent vehicle according to this application.

It should be noted that the steps identified by dashed lines in FIG. 5, that is, S505 to S509, are optional steps, and S506 and S503 may be performed at the same time, or may be performed in a specified sequence. Similarly, S504 and S507, and S505 and S508 may be performed at the same time, or may be performed in a specified sequence. This is not limited in this application.

In this application, in addition to sensor redundancy, to improve safety and reliability of the intelligent vehicle, a redundancy design is also implemented inside a single intelligent driving controller. Next, a data processing process of the intelligent driving controller is further described with reference to an internal structure of the intelligent driving controller shown in FIG. 6.

Figure 6:
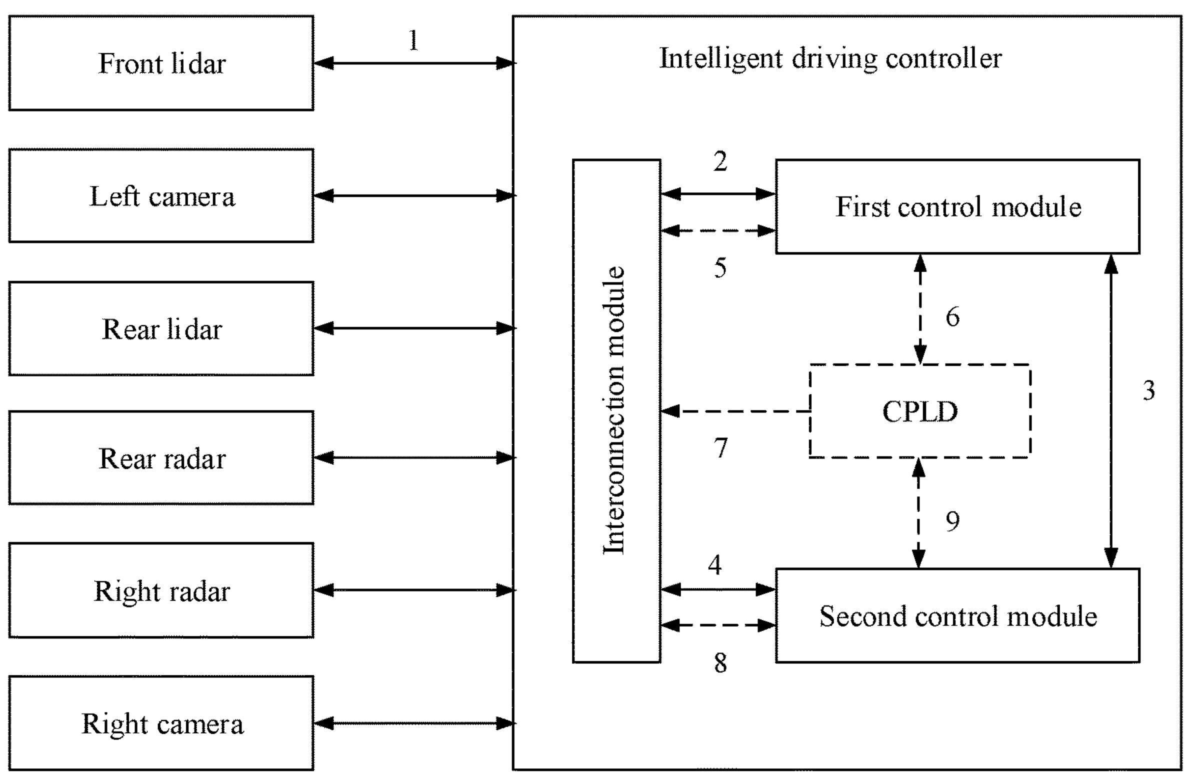
FIG. 6 is an interaction diagram of a data management method for an intelligent vehicle according to this application.

On the basis of the embodiment shown in FIG. 5, FIG. 6 is a schematic diagram of interaction between a group of sensors and an intelligent driving controller connected to the sensors. The intelligent driving controller includes a first control module, a second control module, and an interconnection module. For example, a group of sensors may be a front lidar, a left camera, a rear lidar, a rear radar, a right radar, and a right camera, and may be connected to the intelligent driving controller through a link 1, specifically, connected to the interconnection module of the intelligent driving controller. The first control module is connected to the interconnection module through a link 2, and is connected to the second control module through a link 3, and the second control module is connected to a fourth control module through a link 4. The link 1, the link 2, and the link 4 may be implemented by using high-speed buses, and the link 3 may be implemented by using a low-speed bus.

For specific implementation of the high-speed bus, refer to the related content description in the embodiment shown in FIG. 5. The low-speed bus is a bus whose rate is not higher than a preset rate, and may be specifically any one of a serial peripheral interface (SPI), a bidirectional two-wire synchronous serial bus interface I2C, a management data input/output (MDIO), or a CAN bus.

When the intelligent driving controller is started, the first control module may configure the interconnection module to start the interconnection module, so that the interconnection module is in a normal working state. When configuring the interconnection module, the first control module may first perform power-on and reset deassertion on the interconnection module. To prevent control signals for power-on/off and reset/reset deassertion from being affected by a fault of the first control module or the second control module, the first control module and the second control module may deliver the control signals by using a transit device.

In some possible implementations, the transit device may be a complex programmable logic device (CPLD) register. The first control module may deliver a first control signal to the CPLD through a link 6 between the first control module and the CPLD. The CPLD delivers, based on the first control signal, a power-on and reset deassertion instruction to the interconnection module through a link 7 between the CPLD and the interconnection module, and performs power-on and reset deassertion on the interconnection module. Then, the first control module may deliver interconnection module configuration information through a link 5 between the first control module and the interconnection module, to configure transmission parameters of the interconnection module, such as a port, a VLAN, and a transmission rate. The link 5, the link 6, and the link 7 may be implemented by using low-speed buses. For example, the link 5 may be implemented by using an MDIO, and the link 6 and the link 7 may be implemented by using an SPI or an I2C.

After the configuration, the interconnection module starts to work, and sends data collected by the sensors to the first control module through the link 2 between the interconnection module and the first control module, for example, sends data collected by the front lidar, the left camera, the rear lidar, the rear radar, the right radar, and the right camera. The first control module may further read an error correcting code (ECC) of a static random-access memory (SRAM) and packet statistics information (such as packet loss information and error packet information) of each port in the interconnection module through the link 5, and perform cyclic redundancy check (CRC) on the link 5, to implement management on the interconnection module, and avoid a case in which the intelligent vehicle is out of control when the interconnection module transmits data with low reliability.

Certainly, interconnection modules between different intelligent driving controllers further establish a link connection (which is not shown in FIG. 6) by using a high-speed bus. The interconnection module sends the foregoing data to an interconnection module of another intelligent driving controller through the link connection. The another intelligent driving controller sends data to a first control module inside the another intelligent driving controller in a same manner as the intelligent driving controller shown in FIG. 6.

Through the foregoing data interaction, a first control module of each intelligent driving controller may obtain data collected by each group of sensors. That is, each intelligent driving controller may obtain complete data, to implement sensor data redundancy.

In actual application, a first control module and a second control module in a same intelligent driving controller may monitor working statuses of each other through heartbeat monitoring. Specifically, the intelligent driving controller may periodically send a probe request signal to the first control module by using the second control module. When the second control module detects no probe response signal in K consecutive periodicities, the intelligent driving controller determines that the first control module is faulty.

K is a positive integer, and a value of K may be set according to an empirical value. For example, K may be 3. In some cases, for example, when a security level requirement is relatively high, the value of K may alternatively be 1. In other words, when the second control module detects no probe response signal in a current periodicity, the intelligent driving controller determines that the first control module is faulty.

When the first control module is faulty, the second control module takes over the interconnection module to enable the interconnection module to work normally. In this way, the interconnection module may transmit data to an interconnection module of another intelligent driving controller. The second control module may read the SRAM ECC and the packet statistics information of each port in the interconnection module through a link 8, and perform cyclic redundancy check on the link 8, to manage the interconnection module, and avoid the case in which the intelligent vehicle is out of control when the interconnection module transmits data with low reliability. The link 8 may be implemented by using a low-speed bus, for example, may be implemented by using an MDIO.

Certainly, heartbeat monitoring may also be performed between different intelligent driving controllers. Specifically, the heartbeat monitoring may be performed between different intelligent driving controllers through a link connection between second control modules, or through a link connection formed by a link connection between a second control module and an interconnection module and a link connection between interconnection modules.

Heartbeat monitoring between a first intelligent driving controller and a second intelligent driving controller is used as an example for description. The first intelligent driving controller sends a probe request signal to the second intelligent driving controller through either of the foregoing two link connections. When the first intelligent driving controller detects no probe response signal from the second intelligent driving controller in K consecutive periodicities, the first intelligent driving controller determines that the second intelligent driving controller is faulty. To ensure safety and reliability of intelligent driving, the first intelligent driving controller may perform safe stopping based on received data.

Further, after the intelligent vehicle stops, the second control module may further deliver a second control signal through a link 9 between the second control module and the CPLD register, and the CPLD register delivers a reset and power-off instruction to the interconnection module based on the second control signal through the link 7. After the interconnection module is powered off, a mobile data center (MDC) is powered off to avoid power exhaustion of a battery. The link 7 and the link 9 may be implemented by using low-speed buses, for example, may be implemented by using an SPI or an I2C.

It should be noted that the intelligent driving controller may be compatible with three modes, which specifically include a dual-controller redundancy mode, a first control module-only control mode, and a second control module-only control mode. When a security level required by the intelligent vehicle is higher than a preset level, for example, when an autonomous driving level of the intelligent vehicle is greater than or equal to L3, the first intelligent driving controller is set to the dual-controller redundancy mode. When the security level required by the intelligent vehicle is not higher than the preset level, for example, when the autonomous driving level of the intelligent vehicle is less than L3, or there is another redundancy solution for the intelligent vehicle, the first intelligent driving controller is set to the first control module-only control mode. If the first control module is faulty, the first intelligent driving controller is set to the second control module-only control mode.

When the first intelligent driving controller is set to the dual-controller redundancy mode, for a configuration process of the interconnection module, refer to the related content description in the embodiment shown in FIG. 6. When the first intelligent driving controller is set to the first control module-only control mode, only the first control module interconnects with and manages the configuration module. For a configuration process and a management process, refer to the related content description in the embodiment shown in FIG. 6. When the first intelligent driving controller is set to the second control module-only control mode, the second control module may first perform power-on and reset deassertion on the interconnection module. For details, refer to FIG. 6. The second control module may first deliver a third control signal to the CPLD register through the link 9. The CPLD register delivers the power-on and reset deassertion instruction based on the third control signal through the link 7. After the interconnection module is powered on and the reset is deasserted, the second control module configures the interconnection module through the link 8, and manages the interconnection module through the link 8 after the configuration succeeds.

It should be noted that, for brief description, the method embodiments are described as a combination of a series of actions. However, a person skilled in the art should know that this application is not limited to the described sequence of the actions.

Another appropriate step combination that a person skilled in the art can think of based on the content described above also falls within the protection scope of this application. In addition, a person skilled in the art should also appreciate that all the embodiments described in the specification are example embodiments, and the related actions are not necessarily mandatory to this application.

The foregoing describes in detail the data management method provided in this application with reference to FIG. 1 to FIG. 6. The following describes a data management apparatus and device provided in this application with reference to FIG. 7 and FIG. 8.

Figure 7:
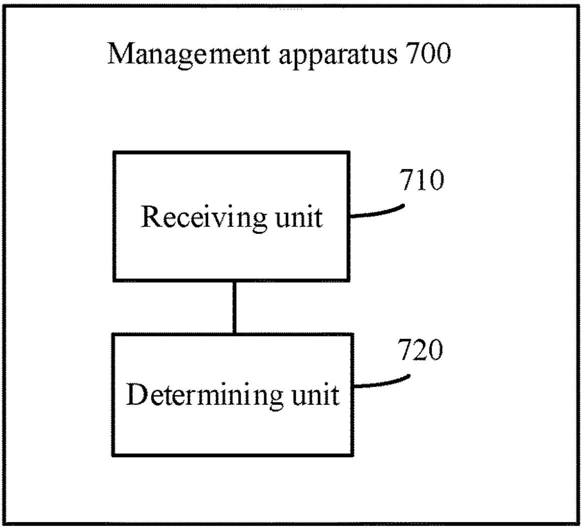
FIG. 7 is a schematic diagram of a structure of a data management apparatus of an intelligent vehicle according to this application.

FIG. 7 shows a data management apparatus 700 according to this application. The management apparatus 700 includes a receiving unit 710 and a storage unit 720.

The receiving unit 710 is configured to receive first data sent by a first group of sensors, and a first intelligent driving controller is configured to receive data collected by the first group of sensors, where the first group of sensors include at least one sensor, and the first data is the data collected by the first group of sensors.

The receiving unit 710 is further configured to receive second data sent by a second intelligent driving controller, where the second data is data collected by a second group of sensors connected to the second intelligent driving controller.

The determining unit 720 is configured to determine a first traveling track of an intelligent vehicle based on the first data and the second data.

Optionally, each group of sensors include different sensor groups that are divided according to a preset rule, where the preset rule includes: first, grouping sensors based on locations of the sensors in the intelligent vehicle, where sensors in a same group can collect data of a 360-degree area around the intelligent vehicle; and then grouping the sensors based on sensor types, where each sensor belongs to only one sensor group.

Optionally, the first intelligent driving controller includes a first control module, a second control module, and an interconnection module. The first control module and the second control module separately communicate with the interconnection module through a high-speed bus, and the first control module communicates with the second control module through a low-speed bus. The first control module is configured to configure and manage the interconnection module, the second control module is configured to manage the interconnection module when the first control module is faulty, and the interconnection module is configured to transmit data between different intelligent driving controllers.

Optionally, the first intelligent driving controller includes three modes. When a security level required by the intelligent vehicle is higher than a preset level, the first intelligent driving controller is set to a dual-controller redundancy mode. When the security level required by the intelligent vehicle is not higher than the preset level, the first intelligent driving controller is set to a first control module-only control mode. When the first control module is faulty, the first intelligent driving controller is set to a second control module-only control mode.

Optionally, the interconnection module of the first intelligent driving controller communicates with an interconnection module of the second intelligent driving controller through a high-speed bus, and the second control module of the first intelligent driving controller communicates with a second control module of the second intelligent driving controller through a low-speed bus.

Optionally, the second control module of the first intelligent driving controller is specifically configured to send a probe request signal to the first control module of the first intelligent driving controller. When no probe response signal is received in K consecutive periodicities, the second control module determines that the first control module is faulty, where K is a positive integer.

Optionally, the first intelligent driving controller is specifically configured to send a probe request signal to the second intelligent driving controller. When no probe response signal is received in K consecutive periodicities, the first intelligent driving controller determines that the second intelligent driving controller is faulty, where K is a positive integer.

Optionally, the data management apparatus 700 further includes: a first sending unit, configured to send the first data to the second intelligent driving controller, so that the second intelligent driving controller determines a second traveling track of the intelligent vehicle based on the first data and the second data, and sends the second traveling track to an arbiter.

Optionally, the data management apparatus 700 further includes: a second sending unit, configured to send the first traveling track to the arbiter, so that the arbiter determines a traveling track of the intelligent vehicle based on the first traveling track and the second traveling track.

The management apparatus 700 according to this embodiment of this application may correspondingly perform the method described in the embodiments of this application. In addition, the foregoing and other operations and/or functions of the units in the management apparatus 700 are separately used to implement the corresponding procedures of the method in FIG. 5 and FIG. 6. For brevity, details are not described herein again.

Figure 8:
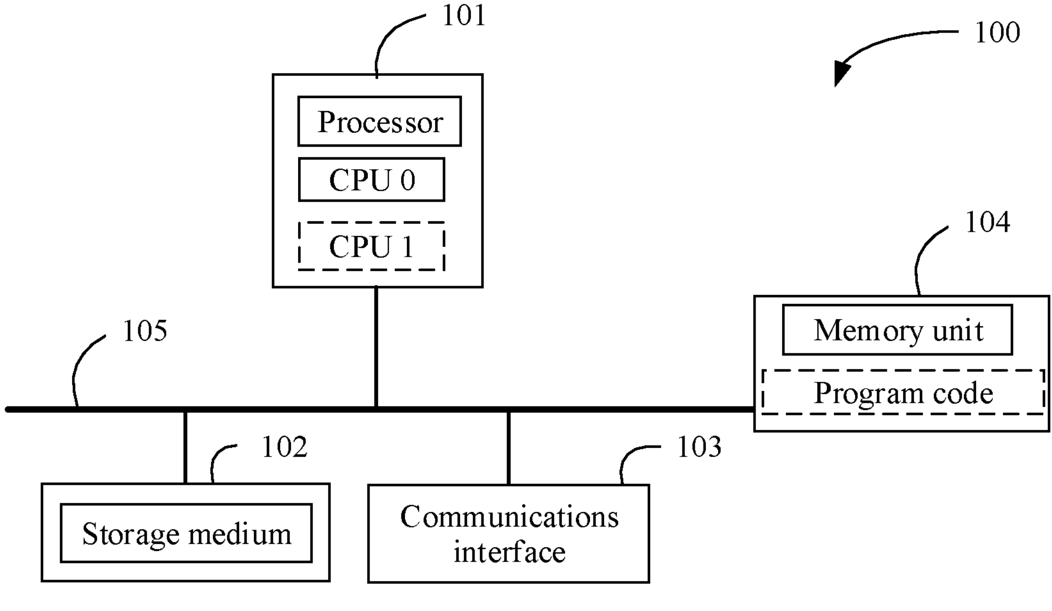
FIG. 8 is a schematic diagram of a structure of a data management device of an intelligent vehicle according to this application.

FIG. 8 is a schematic diagram of a data management device 100 according to this application. As shown in the figure, the data management device 100 includes a processor 101, a storage medium 102, a communications interface 103, and a memory unit 104. The processor 701, the storage medium 102, the communications interface 103, and the memory unit 104 communicate with each other by using a bus 105, or may communicate with each other in another manner such as wireless transmission. The memory 102 is configured to store instructions, and the processor 101 is configured to execute the instructions stored in the memory 102. The memory 102 stores program code, and the processor 101 may invoke the program code stored in the memory 102 to perform the following operations: receiving first data sent by a first group of sensors, where a first intelligent driving controller is configured to receive data collected by the first group of sensors, the first group of sensors include at least one sensor, and the first data is the data collected by the first group of sensors; receiving second data sent by a second intelligent driving controller, where the second data is data collected by a second group of sensors connected to the second intelligent driving controller; and determining a first traveling track of an intelligent vehicle based on the first data and the second data.

It should be understood that in this embodiment of this application, the processor 101 may be a CPU, or the processor 101 may be another general-purpose processor, a DSP, an ASIC, an FPGA or another programmable logic device, a discrete gate or transistor logic device, a discrete hardware component, or the like. The general-purpose processor may be a microprocessor, any conventional processor, or the like.

The memory 102 may include a read-only memory and a random access memory, and provide instructions and data to the processor 101. The memory 102 may further include a nonvolatile random access memory. For example, the memory 102 may further store information about a device type.

The memory 102 may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM), used as an external cache. Through example but not limitative description, many forms of RAMs may be used, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a SynchLink dynamic random random-access (SLDRAM), and a direct Rambus random-access memory (DR RAM).

The bus 105 may include a power bus, a control bus, a status signal bus, and the like in addition to a data bus. However, for clear description, various types of buses in the figure are marked as the bus 105.

It should be understood that the data management device 100 according to this embodiment of this application may correspond to the management apparatus 400 in the embodiments of this application, and may correspond to a corresponding subject in the method shown in FIG. 5 according to the embodiments of this application. In addition, the foregoing and other operations and/or functions of the modules in the data management device 100 are separately used to implement corresponding procedures of the method shown in FIG. 5. For brevity, details are not described herein again.

In another possible embodiment, this application further provides an intelligent driving vehicle. The intelligent driving vehicle includes the sensor management system shown in FIG. 1, and is configured to implement each operation step of the method shown in FIG. 5. For brevity, details are not described herein again.

In another possible embodiment, this application further provides a sensor management system. The sensor management system includes at least two groups of sensors shown in FIG. 2, each group of sensors are connected to one intelligent driving controller shown in FIG. 2, and different intelligent driving controllers communicate with each other by using an interconnection module.

A first intelligent driving controller receives first data sent by a first group of sensors, and is configured to receive data collected by the first group of sensors, where the first group of sensors include at least one sensor, and the first data is the data collected by the first group of sensors.

The first intelligent driving controller receives second data sent by a second intelligent driving controller, where the second data is data collected by a second group of sensors connected to the second intelligent driving controller.

The first intelligent driving controller determines a first traveling track of the intelligent vehicle based on the first data and the second data.

The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a training device or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

In addition, it should be noted that the described apparatus embodiment is merely an example. The units described as separate parts may or may not be physically separate, and parts displayed as units may or may not be physical units, that is, may be located in one place, or may be distributed on a plurality of network units. Some or all of the modules may be selected based on actual requirements to achieve the objectives of the solutions of this application. In addition, in the accompanying drawings of the apparatus provided by this application, connection relationships between the modules indicate that the modules have communication connections with each other, which may be specifically implemented as one or more communications buses or signal cables.

What is claimed is:

1. A vehicle sensor management method implemented by a first driving controller comprising a first system on chip (SOC) and a first microcontroller unit (MCU), the vehicle sensor management method comprising:

- establishing, via a first local area network switch (LSW), a closed-loop feedback control pathway with a first group of sensors, wherein the first LSW is coupled to the first group of sensors, a second group of sensors, and to the first SOC and the first MCU;
- sending first sensor configuration information to the first group of sensors via the first LSW;
- receiving, via the first LSW, first sensor data originating from the first group of sensors in response to application of the first sensor configuration information;
- evaluating the first sensor data to obtain operational parameters of the first group of sensors;
- generating, based on the operational parameters, updated first sensor configuration information adapted to modify operational behavior of the first group of sensors;
- sending, via the first LSW, the updated first sensor configuration information to the first group of sensors;
- receiving, via the first LSW, second sensor data originating from the second group of sensors; and
- determining a first traveling track of a vehicle based on the first sensor data and the second sensor data;
- wherein the first SOC manages the first LSW when the first SOC is in a working state and the first MCU manages the first LSW when the first SOC is faulty.

2. The vehicle sensor management method of claim 1, further comprising:

- sending a probe request signal to a first SOC within the first driving controller using a first MCU within the first driving controller; and
- determining, when no probe response signal is received in response to the probe request signal and within K consecutive periodicities, that the first SOC is faulty, wherein K is a positive integer.

3. The vehicle sensor management method of claim 1, further comprising:

- sending a probe request signal to a second driving controller; and
- determining, when no probe response signal is received in response to the probe request signal and within K consecutive periodicities, that the second driving controller is faulty, wherein K is a positive integer.

4. The vehicle sensor management method of claim 1, further comprising sending the first sensor data to a second driving controller.

5. The vehicle sensor management method of claim 4, further comprising sending the first traveling track to an arbiter.

6. A vehicle sensor management device, comprising:

- a first group of sensors configured to collect first sensor data;
- a second group of sensors configured to collect second sensor data;
- a first driving controller configured to receive the first sensor data, and comprising:
  - a first system on chip (SOC);
  - a first microcontroller unit (MCU); and
  - a first local area network switch (LSW) coupled to the first group of sensors, the second group of sensors, the first SOC, and the first MCU, wherein the first LSW is configured to transmit the first sensor data and the second sensor data, wherein the first SOC is configured to manage the first LSW when the first SOC is in a working state, and wherein the first MCU is configured to manage the first LSW when the first SOC is faulty;
- a second driving controller coupled to the first LSW and configured to receive the second sensor data;
- at least one processor; and
- a memory coupled to the at least one processor and configured to store programming instructions that, when executed by the at least one processor, cause the vehicle sensor management device to:

establish, via the first LSW, a closed-loop feedback control pathway with the first group of sensors;

send, to the first group of sensors, via the first LSW, first sensor configuration information;

receive, via the first LSW, and in response to application of the first sensor configuration information, the first sensor data collected by the first group of sensors;

evaluate the first sensor data to obtain operational parameters of the first group of sensors;

generate, based on the operational parameters, updated sensor configuration information adapted to modify operational behavior of the first group of sensors;

send, to the first group of sensors, via the first LSW, the updated sensor configuration information;

receive, from the second driving controller, via the first LSW, the second sensor data; and determine a first traveling track of a vehicle based on the updated first sensor data and the second sensor data.

7. The vehicle sensor management device of claim 6, wherein when executed by the at least one processor, the programming instructions further cause the vehicle sensor management device to:

send a probe request signal to a first SOC of a first driving controller using the first MCU; and determine, when no probe response signal is received in response to the probe request signal and within K consecutive periodicities, that the first SOC is faulty, wherein K is a positive integer.

8. The vehicle sensor management device of claim 6, wherein when executed by the at least one processor, the programming instructions further cause the vehicle sensor management device to:

send a probe request signal to the second driving controller; and determine, when no probe response signal is received in response to the probe request signal and within K consecutive periodicities, that the second driving controller is faulty, wherein K is a positive integer.

9. The vehicle sensor management device of claim 6, wherein when executed by the at least one processor, the programming instructions further cause the vehicle sensor management device to send, via the first LSW, the first sensor data to the second driving controller.

10. The vehicle sensor management device of claim 6, wherein management of the first LSW comprises monitoring a working status of the first LSW and checking integrity of the first sensor data or the second sensor data transmitted by the first LSW.

11. A vehicle sensor management system comprising:

a first group of sensors configured to provide first sensor data;

a second group of sensors configured to provide second sensor data;

a first driving controller configured to receive the first sensor data, and comprising:

a first system on chip (SOC);

a first microcontroller unit (MCU); and a first local area network switch (LSW) coupled to the first group of sensors, the second group of sensors, the first SOC, and the first MCU, wherein the first SOC is configured to:

establish, via the first LSW, a closed-loop feedback control pathway with the first group of sensors;

send first sensor configuration information to the first group of sensors via the first LSW;

receive, via the first LSW and in response to application of the first sensor configuration information, the first sensor data originating from the first group of sensors;

evaluate the first sensor data to obtain operational parameters of the first group of sensors;

generate, based on the operational parameters, updated first sensor configuration information adapted to modify operational behavior of the first group of sensors; and send, via the first LSW, updated first sensor configuration information to the first group of sensors;

wherein the first LSW is further configured to receive the second sensor data originating from the second group of sensors; and a second driving controller comprising:

a second SOC;

a second MCU; and a second LSW coupled to the second group of sensors, the second SOC and the second MCU, wherein the second LSW is configured to transmit the second sensor data, and wherein the second SOC and the second MCU are each configured to send the second sensor data through the second LSW, wherein the first driving controller is configured to:

receive the first sensor data from the first LSW;

receive the second sensor data from the second LSW; and determine, based on the first sensor data and the second sensor data, a first traveling track of a vehicle.

12. The vehicle sensor management system of claim 11, wherein each of the first group of sensors and the second group of sensors comprise different sensors of the vehicle that are grouped according to a preset rule, wherein the preset rule comprises:

grouping based on locations of the sensors, wherein first sensors in a same group are configured to collect data of a 360-degree area around the vehicle; and grouping based on sensor types such that each sensor belongs to only one sensor group.

13. The vehicle sensor management system of claim 11, wherein the first driving controller further comprises:

a first bus, wherein the first LSW is separately coupled to the first SOC and the first MCU by the first bus and is configured to transmit third data received by the first driving controller to the second driving controller; and a second bus that has a lower speed than the first bus and that is coupled to the first SOC and the first MCU, wherein the second driving controller further comprises:

a third bus, wherein the second LSW is separately coupled to the second SOC and the second MCU by the third bus and is configured to transmit fourth data received by the second driving controller to the first driving controller; and a fourth bus that has a lower speed than the third bus and that is coupled to the second SOC and the second MCU, wherein the first SOC and the first MCU are configured to separately communicate with the first LSW through the first bus, wherein the second SOC and the second MCU are configured to separately communicate with the second LSW through the third bus, wherein the first SOC is configured to communicate with the first MCU through the second bus, wherein the second SOC is configured to communicate with the second MCU through the fourth bus, wherein the first SOC is configured to configure and manage the first LSW, wherein the second SOC is configured to configure and manage the second LSW, wherein the first MCU is configured to manage the first LSW when the first SOC is faulty, and wherein the second MCU is configured to manage the second LSW when the second SOC is faulty.

14. The vehicle sensor management system of claim 11, wherein the first driving controller is further configured to:

set to a dual-controller redundancy mode when a security level required by the vehicle is higher than a preset level;

set to a first SOC only control mode when the security level required by the vehicle is not higher than the preset level; and set to a first MCU only control mode when the first SOC is faulty.

15. The vehicle sensor management system of claim 11, further comprising a first bus and a second bus having a lower speed than the first bus, wherein the first LSW is configured to communicate with the second LSW through the first bus, and wherein the first SOC is configured to communicate with the first MCU through the second bus.

16. The vehicle sensor management system of claim 11, wherein the first driving controller is further configured to:

send a probe request signal to the first SOC using the first MCU; and determine, when no probe response signal is received in response to the probe request signal and within K consecutive periodicities, that the first SOC is faulty, wherein K is a positive integer.

17. The vehicle sensor management system of claim 11, wherein the first driving controller is further configured to:

send a probe request signal to the second driving controller; and determine, when no probe response signal is received in response to the probe request signal and within K consecutive periodicities, that the second driving controller is faulty, wherein K is a positive integer.

18. The vehicle sensor management system of claim 11, wherein the first driving controller is further configured to send the first sensor data to the second driving controller, and wherein the second driving controller is configured to:

determine a second traveling track of the vehicle based on the first sensor data and the second sensor data; and send the second traveling track to an arbiter.

19. The vehicle sensor management system of claim 11, wherein the first LSW is further configured for transmission parameters including at least one of the following: a communication port, a virtual local area network (VLAN), or a transmission rate.

20. The vehicle sensor management system of claim 11, wherein of the first LSW comprises monitoring a working status of the first LSW and checking integrity of the first sensor data or the second sensor data transmitted by the first LSW.

* * * * *